United States Patent [19]

Hwang

[11] 4,071,673
[45] Jan. 31, 1978

[54] CATALYST AND METHOD
[75] Inventor: Yu-Tang Hwang, Clinton, Iowa
[73] Assignee: Chemplex Company, Rolling Meadows, Ill.
[21] Appl. No.: 738,555
[22] Filed: Nov. 3, 1976
[51] Int. Cl.$^2$ .......................... C08F 4/78; C08F 10/00
[52] U.S. Cl. ................................ 526/123; 252/429 R; 252/430; 252/431 R; 252/431 N; 526/106; 526/130; 526/154; 526/172; 526/352
[58] Field of Search ............... 526/106, 123, 130, 154, 526/172; 252/429 R, 430, 431 R, 431 N

[56] References Cited
U.S. PATENT DOCUMENTS

| | | | |
|---|---|---|---|
| 3,324,092 | 6/1967 | Naarman et al. | 526/172 |
| 3,860,568 | 1/1975 | Chabent et al. | 526/123 |
| 3,953,413 | 4/1976 | Hwang et al. | 526/350 |
| 3,986,983 | 10/1976 | Hoff et al. | 252/431 R |

FOREIGN PATENT DOCUMENTS 1,128,724   10/1968   United Kingdom ................. 526/123

*Primary Examiner*—Alan Holler
*Attorney, Agent, or Firm*—Wegner, Stellman, McCord, Wiles & Wood

[57] ABSTRACT

A new catalyst and method of making polymers therewith and the process of preparing the catalyst in which the catalyst is prepared by dispersing on a finely divided carrier material, particularly a difficultly reducible inorganic support such as silica, an organic chromium complex such as a chelate derived from orthohydroxyphenyl or 2'-hydroxyphenyl carbonyl compounds, including ketone, aldehyde and amide types, and their derivatives, and activating the resulting mixture by heating at an elevated temperature in a non-oxidizing atmosphere.

35 Claims, No Drawings

CATALYST AND METHOD

CROSS REFERENCE TO RELATED PATENT & APPLICATION

The following patent and patent application are broadly concerned with somewhat similar catalysts:

Hwang & Grimmett U.S. Pat. No. 3,953,413 covering essentially chromium chelates of beta-dicarbonyl compounds as catalyst ingredients.

Hwang & Grimmett application Ser. No. 674,450, filed Apr. 7, 1976, which discloses modifying the catalyst support of U.S. Pat. No. 3,953,413.

The above patent and application are assigned to the assignee hereof.

BACKGROUND OF THE INVENTION

The new and improved catalysts and methods of this invention involve dispersing on a finely divided and difficult to reduce inorganic oxide selected from silica, alumina, thoria, zirconia, titania, magnesia and mixtures or composites thereof an organic chromium complex such as a chelate derived from orthohydroxyphenyl or 2'-hydroxyphenyl carbonyl compounds, including ketone, aldehyde and amide types, and their derivatives, and activating the resulting mixture by heating to and at an elevated temperature in a non-oxidizing atmosphere with a specific temperature range being within about 600°–2000° F.

SUMMARY OF THE INVENTION

In accordance with this invention 1-olefins of 2 to 8 carbon atoms are polymerized or copolymerized with $C_2$–$C_{20}$ 1-olefins to form solid polymers or copolymers in the presence of the catalyst of this invention which comprises essentially low-valent chromium surface species as an active ingredient dispersed and supported on at least one difficult to reduce inorganic oxide.

More uniquely, the novel catalyst is prepared by dispersing on a finely divided inorganic support of the class consisting of silica, alumina, thoria, zirconia, magnesia, titania and mixtures and composites thereof an organic chromium-bearing compound and specifically an organic chromium complex such as a chelate derived from orthohydroxyphenyl or 2'-hydroxyphenyl carbonyl compounds, including ketone, aldehyde and amide types, and their derivatives, and then activating the resulting mixture by heating to and at an elevated temperature of from about 600–2000° F. in a non-oxidizing atmosphere.

DESCRIPTION OF THE PREFERRED EMBODIMENTS

In accordance with this invention polymerizable olefinic compounds and especially 1-olefins of 2 to 8 carbon atoms are polymerized or copolymerized with $C_2$–$C_{20}$ 1-olefins to form solid polymers and copolymers in the presence of the novel catalyst which is further specified as follows.

The organic chromium compounds suitable for preparing the catalyst of this invention include virtually all the chromium chelates or complexes derived from an orthohydroxyphenyl ketone, a substituted or non-substituted salicylaldehyde, and an N-substituted or non-substituted salicylamide, the chromium chelates or complexes being essentially of the formula

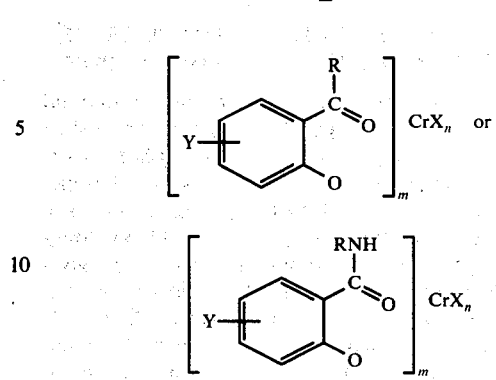

wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, X is an inorganic or organic negative group relative to chromium such as halide, alkyl, alkoxy, and the like, Y is selected from hydrogen, hydroxyl, alkoxy, and alkyl groups, $m$ is a whole number of 1 to 3, $n$ is a whole number of 0 to 2, and $m$ plus $n$ is 2 or 3.

CATALYST PREPARATION

In preparing a catalyst of this invention a series of steps are normally taken as follows, some being optional as indicated.

PRETREATMENT OF SUPPORT

The catalyst support, selected from silica, alumina, zirconia, thoria, magnesia, titania, or mixtures and composites thereof resulting from coprecipitation, impregnation, vapor-phase deposition, etc. may have surface areas ranging from a few $m^2/g$ to over 700 $m^2/g$. Pore volume is preferably in excess of 0.5 cc/g if surface is primarily related to micropores. A finely divided nonporous support with relatively high surface area such as "Cab-O-Sil" may also be used in this invention.

Although not required, pretreatment of the support prior to its impregnation with an appropriate organic chromium compound is often preferred. Such pretreatment typically consists of adjusting the moisture content of the support by drying at elevated temperatures or chemically modifying the support with compounds containing metallic elements such as zirconium, titanium, boron, vanadium, tin, molybdenum, magnesium, hafnium or the like. Chemical modification may include adding compounds such as ammonium hexafluorosilicate which can react with the support or with the organic chromium compound during activation. Chemical modification using metal alkyls which react with the support can also be used.

The chemically modified support, especially when involving the aqueous solution impregnation, is generally calcined at elevated temperatures to fix a modifier onto the support and also to expel an excess amount of moisture, much the same way as adjusting the moisture content in the unmodified support. The calcining or drying step is normally carried out at temperatures from 300° to 2000° F. and can be done by any process known in the art such as in a muffle furnace or in a heated fluidized bed using gases such as nitrogen, air, carbon monoxide, or other suitable reactive or inert gases as fluidizing gases.

DISPERSION OF THE CHROMIUM-BEARING COMPOUND OR MIXTURE ON THE SUPPORT

The dispersion of the chromium-bearing compound or mixture on the support can be readily accomplished by a conventional impregnation method using an organic solvent such as toluene, acetone or hexane. Equally satisfactory dispersion is often achieved by a more convenient method which calls for dry-blending of the chromium-bearing compound or mixture with the support and effecting the final dispersion during the initial stage of activation. If such a dry-blending technique is used, the subsequent activation is best carried out in the fluid bed operation. The optimum chromium content of the catalyst is dependent on the support type, surface area and pore structure. With a typical support whose surface area is 100–800 m$^2$/g and total pore volume is 0–3.0 cc/g, the chromium level may range from 0.05–10% with the preferred level somewhere around 0.1–2.0 weight percent on the dry basis.

THERMAL ACTIVATION OF THE CATALYST IN NON-OXIDIZING ATMOSPHERE

In accordance with this invention, the non-oxidizing atmosphere is provided either by inert gas such as nitrogen, helium, argon, etc., by reducing gas such as carbon monoxide, hydrogen, etc., or by evacuation to a sufficiently high vacuum. In the latter case, it is desirable to permit deliberate leak-in of a small amount of non-oxidizing gas. In all cases, a mixture of non-oxidizing gases may be used, if desired.

When the activation is carried out in non-oxidizing (inert or reducing) gas atmosphere, either fluid-bed or stationary-bed operation may be used. Experience, however, shows that fluid-bed operation is preferable. Normally, for economic reasons, deoxygenated nitrogen is used to fluidize the catalyst in an activator. It was experimentally established that even a minute contamination of oxygen during the activation generally has a detrimental effect on catalyst activity, and that such an adverse effect is greatly magnified when the chromium level is reduced to about 0.15% from a more typical 1 weight percent, often to the extent of completely deactivating the catalyst.

The activation step is usually carried out using a pre-selected heating cycle which includes heating the catalyst up to a specific temperature, usually in the range of 600°–2000° F., holding the catalyst at this temperature for a prescribed length of time, usually 30 minutes to 12 hours, followed by cooling to ambient temperature in nitrogen atmosphere. The heating cycle may also include one or more hold periods at temperatures below the maximum, as mentioned above, to permit diffusion of moisture, solvent or gaseous products from the catalyst pores, or to permit reactions such as decomposition of the surface organic chromium species to take place. The final activation temperature is usually selected on the basis of several factors, such as desired resin properties, support type, pretreatment, etc. The heat-up rate above 600° F. is generally not critical.

POLYMERIZATION PROCESSES

The novel catalysts of this invention may be used to produce polymers and copolymers in liquid-phase, solution or slurry processes or vapor-phase processes. In the liquid-phase operation, any $C_3$–$C_{12}$ saturated liquid hydrocarbon may be used as a reaction medium or diluent. Other types of solvents including aromatic hydrocarbons and chlorinated solvents may also be used. The polymerization of 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

In liquid-phase processes, the olefin polymer or copolymer is normally recovered by flashing off solvent without any intervening steps for removal of the catalyst. The activity of the catalysts described in this invention is normally greater than 3000 pounds of polymer per pound of catalyst so that catalyst removal is unnecessary for practical purposes. Reactor conditions are dependent on the type of olefin as well as the desired polymer properties. In the case of ethylene, reactor pressures may range from 50 to 1000 psig, temperatures from 150°–500° F. and solid levels from 5–60% by weight.

The following examples illustrate the invention.

EXAMPLE 1

A catalyst was prepared by the following steps:

1. About 10 pounds of Davison 952 MS-ID silica gel, having about 350 m$^2$/g surface area and 1.70 cc/g total pore volume, was dried in the pilot plant scale activator, essentially a 12 inch I.D. by 30 inch long cylinder equipped with a gas dispersing plate and an encircling electrical heater. The actual drying was accomplished in the fluid bed maintained by 100 SCFH of air and held at 1300° F. for 5 hours.

2. 20.0 grams of this predried silica was impregnated with a 60 ml toluene solution containing 2.27 grams of commercially available chromium (III) 2'-hydroxyacetophenone complex/chelate, also known as tris (2'-hydroxyacetophenono)chromium.

3. The solvent was then evaporated off at 85–150° F. by nitrogen sweep until the catalyst became free flowing. This drying step always followed the impregnation using organic solvent, and its mention will be omitted in the subsequent examples for simplicity.

4. About 20 grams of this impregnated and partially dried catalyst was charged into a catalyst activator consisting of a 38mm O.D., 27 inch long Vycor glass tube, fitted with a fritted disc in the mid-section of the tube for the purpose of fluidizing the catalyst and provided with tubular electrical heaters around the tube for adjusting the catalyst temperature. The catalyst was then fluidized with the flow of deoxygenated nitrogen, approximately 400 cc/min., and activated according to the following heating cycle: (a) hold at 250° F. for 1 hour, (b) hold at 350° F. for 1 hour, (c) hold at 550° F. for 1 hour, (d) raise 200° F. every 15 minutes up to 1600° F., (e) hold at 1600° F. for 2 hours, and (f) cool down to ambient temperature in nitrogen atmosphere. The deoxygenated nitrogen used in this and subsequent examples was obtained by passing high purity nitrogen through a bed of reduced copper catalyst.

5. The catalyst thus activated was transferred into a closed flask equipped with a hose-and-clamp at both openings without exposing it to air. This step was also applicable to all the subsequent examples and its mention will be omitted hereafter for simplicity.

Evaluation of the activated catalyst for its ethylene polymerization activity was carried out in accordance with a general procedure as follows. The reactor, essentially an autoclave 5 inches I.D. and about 12 inches deep, was equipped with an agitator rotating at 560 rpm, a flush bottom valve, and three ports for charging catalyst, isobutane, and ethylene, respectively. The reactor temperature was controlled by a jacket containing methanol which was kept boiling by an electrical heater encircling the jacket. The control mechanism involved the automatic adjustment of jacket pressures in response to either cooling or heating requirements.

To test a catalyst, the reactor was first thoroughly purged with ethylene at temperatures of around 200° F., followed by the transfer of 0.05–0.5 g of catalyst from a catalyst flask under nitrogen into the reactor via a transfer tube without exposing it to air. After the catalyst charge port was closed, 2900 ml isobutane (dried and deoxygenated) was charged into the reactor, trapped ethylene was vented, and the reactor was allowed to warm up to 225° F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of a test run was normally from 40 minutes to 4 hours depending on the polymerization rate or desired productivity.

At the end of a test run, ethylene flow was cut off, the flush bottom valve was opened, and the reactor content was dumped into a recovery pot, approximately 5 inches I.D. and 10 inches deep, where isobutane was allowed to flash off through a 200 mesh screen into the vent. Polymer particles left in the pot were recovered and weighed.

In this particular example, the activated catalyst was tested twice. The first run involved a catalyst charge of 0.1915 g, lasted for 60 minutes including 6 minutes of induction, and resulted in the recovery of 60 grams of polymer having the unmilled resin melt index of 0.33. The second run used a catalyst charge of 0.1836 g, terminated after 60 minutes including 5 minutes of induction and produced 88 grams of polymer having the unmilled resin melt index of 0.24. Reactivities in these two runs were 313 and 479 g/g/hr., respectively.

EXAMPLE 2

This example illustrates the chemical modification of the support prior to the dispersion of chromium (III) 2'-hydroxyacetophenone complex thereon.

A catalyst used in this example was prepared by the following steps:

1. 400 grams of Davison 952 MS-ID silica was impregnated with an aqueous solution prepared by dissolving 9.65 grams zirconium tetrachloride in 1200 ml demineralized water, followed by drying at 230° F. in an oven equipped with mechanical convection until free flowing. Afterward, the temperature was raised to 400° F. and kept there for 4 hours in the same oven.

2. This zirconium tetrachloride-modified silica was then calcined in a muffle furnace by a heating cycle consisting of (a) hold at 400° F. for one hour, (b) raising 90° F. every 15 minutes up to 1200° F. (c) hold at 1200° F. for 4 hours, and (d) cool down to room temperature.

3. 25.0 grams of this zirconium-modified silica was then impregnated with a 60 ml toluene solution containing 2.2 grams of chromium (III) 2'-hydroxyacetophenone complex.

4. About 15 grams of this impregnated and partially dried catalyst was activated by the method described in Example 1 except the final hold temperature was 1700° F. instead of 1600° F.

The activated catalyst was evaluated in accordance with the general procedure described in Example 1. For a catalyst charge of 0.1981 g and run time of 60 minutes including 6 minutes of induction, there was recovered 80 grams of polymer having the unmilled resin melt index of 0.81.

EXAMPLE 3

This example illustrates a variation in the catalyst preparation in which the impregnation step was replaced by dry blending.

A catalyst was prepared by a method essentially the same as in Example 2 except that 12.5 grams of 1200° F.—calcined zirconium—modified 952 MS-ID silica was dry blended with 1.10 grams chromium (III) 2'-hydroxyacetophenone complex rather than impregnated with the latter using toluene as solvent. The above mixture was activated as in Example 2.

According to the general test procedure described in Example 1, 0.1518 g of the catalyst was charged to the reactor, and the test run was continued for 60 minutes including 10 minutes of induction. There was recovered 45 grams of polymer having the resin melt index of 0.32 on an unmilled sample.

EXAMPLE 4

This example illustrates the use of chromium (III) 2',5'-dihydroxyacetophenone complex as a catalyst ingredient.

The organic chromium compound used in this example was prepared by heating a mixture of 12 grams 2',5'-dihydroxyacetophenone and 7 grams $CrCl_3 \cdot 6H_2O$. After the evolution of HCl ceased, there was obtained the reaction product, a dark green powder, soluble in water as well as in acetone. This crude product was partially purified by dissolving it in 180 ml acetone, filtering off the insolubles and recrystallizing the chromium compound after the mother liquor was concentrated to about 10~20 ml. There was recovered about 1.8 grams of chromium complex.

The above chromium complex was dissolved in 40 ml acetone to impregnate 18.4 grams of the predried 952 MS-ID silica described in Example 1. About 15 grams of this impregnated and partially dried catalyst was activated by the method essentially the same as in Example 1.

The catalyst thus prepared was tested for its ethylene polymerization activity according to the general procedure described in Example 1. For a catalyst charge of 0.2042 g and run time of 60 minutes, 31 grams of polymer was recovered having the unmilled resin melt index of 0.21.

EXAMPLE 5

This example demonstrates the applicability of this invention to chromium complexes derived from salicylamide, also known as 2'-hydroxybenzamide.

The chromium (III) complex of salicylamide was prepared by heating a mixture of 20 grams salicylamide and 13 grams of $CrCl_3 \cdot 6H_2O$ at about 300° F. for several hours until the evolution of HCl was no longer detectable. The crude reaction product was ground into powder and washed with water until the wash water was clear. The solid left was then dissolved in methanol, the insolubles were filtered off and the filtrate was evaporated to dryness. About 8 grams of green powder was recovered.

A catalyst was prepared by impregnating 30 grams of the 1200° F.-calcined zirconium tetrachloride-modified 952 MS-ID silica described in Example 2 with 2.7 grams of the above chromium (III) complex of salicylamide using 90 ml methanol as solvent. About 15 grams of the impregnated and partially dried catalyst was then activated in a manner similar to Example 1 except for some differences in the heating cycle which called for an intermediate hold at 750° F. for 1 hour and a final hold at 1700° F. for 2 hours.

For a catalyst charge of 0.2259 g and run time of 60 minutes, 42 grams of polymer was obtained, in accordance with the general test procedure described in Example 1.

EXAMPLE 6

This example further illustrates the invention using chromium (III) complexes derived from salicylanilide.

The chromium complex of salicylanilide used in this example was prepared by heating a mixture of 8.5 grams $CrCl_3 \cdot 6H_2O$ and 20 grams salicylanilide to melting and allowing HCl to evolve over several hours. The reaction product was washed with water until the wash water was clear, and then dissolved in 150 ml acetone for removal of insolubles. The filtrate was evaporated to dryness and about 20 grams of a solid product was recovered.

A catalyst was prepared by impregnating 30 grams of the predried 952 MS-ID silica described in Example 1 with 4.0 grams of the above chromium complex using 90 ml acetone as solvent. About 15 grams of the impregnated and partially dried catalyst was activated in deoxygenated nitrogen by the method described in Example 1.

The catalyst thus prepared was evaluated according to the general method described in Example 1. By charging 0.1631 g of catalyst and terminating the run after 60 minutes including the induction period, there was recovered 11 grams of polymer having the unmilled resin melt index of 0.45.

EXAMPLE 7

This example illustrates the use of chromium complexes derived from salicylaldehyde, also called 2'-hydroxybenzaldehyde.

The organic chromium complex used in this example was prepared by heating a mixture of 12 grams salicylaldehyde and 11.4 grams chromium acetylacetonate to and at about 285°-320° F. for several hours. A lumpy solid residue was ground, the resulting powder was washed with water until the wash water was clear, the dehydrated powder was dissolved in 150 ml acetone for removal of the insolubles and the filtrate was evaporated to dryness to recover about 2.6 grams of the purified material. The absence of unreacted chromium acetylacetonate in the product was indicated by a lack of reddish purple color characteristic of chromium acetylacetonate.

2.4 grams of the above chromium complex was dissolved in 90 ml acetone to impregnate 30 grams of the predried 952 MS-ID silica described in Example 1. About 15 grams of the impregnated and partially dried catalyst was activated essentially by the same method as in Example 1.

The finished catalyst was tested twice in accordance with the general test method described in Example 1. For catalyst charges of 0.1868 and 0.1663, and run times of 60 and 65 minutes, 36.0 and 28.8 grams of polymer were recovered having the unmilled resin melt indices of 1.98 and 0.60, respectively. The reactivities were calculated to be 193 and 160 g/g/hr, respectively.

Having described my invention as related to the embodiments set out herein, it is my intention that the invention be not limited by any of the details of description, unless otherwise specified, but rather be construed broadly within its spirit and scope as set out in the appended claims.

I claim:

1. A catalyst prepared by dispersing on a finely divided, difficultly reducible, inorganic support of the class consisting of silica, alumina, thoria, zironia, titania, magnesia, and mixtures thereof a chromium chelate of an orthohydroxy carbonyl compound essentially of the formula of the class consisting of

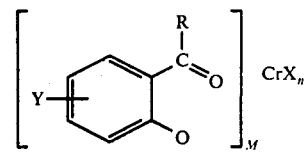

and

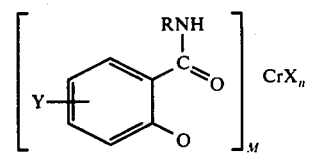

wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, X is a negative group relative to chromium selected from the group consisting of halide, alkyl and alkoxy, Y is selected from hydrogen, hydroxyl, alkoxy, and alkyl groups, $m$ is a whole number of 1 to 3, $n$ is a whole number of 0 to 2, and $m$ plus $n$ is 2 or 3, and activating the resulting mixture by heating to and at an elevated temperature of from about 600–2000° F. in a non-oxidizing atmosphere.

2. The catalyst of claim 1 wherein said chromium compound is essentially of the formula

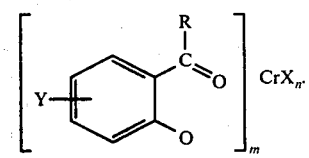

3. The catalyst of claim 1 wherein said chromium compound is essentially of the formula

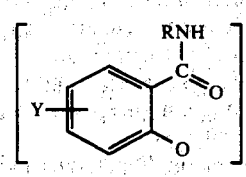

4. The catalyst of claim 1 wherein said support prior to the addition of said chromium compound is dried by heat pretreatment by heating at a temperature of from about 300–2000° F. until volatile matter is at least partially driven off.

5. The catalyst of claim 1 wherein said chromium compound is dissolved in a solvent and the resulting solution used to impregnate said support.

6. The catalyst of claim 1 wherein said dispersing of said chromium compound is accomplished by dry blending with said finely divided support followed by heating in a fluid bed maintained in suspension with a non-oxidizing gas flowing through said support during said heating.

7. The catalyst of claim 1 wherein said activating is accomplished in a fluid bed maintained in suspension with the flow of a non-oxidizing gas.

8. The catalyst of claim 1 wherein said catalyst on a dry basis contains an amount of said chromium compound to provide about 0.05–10 wt.% of chromium.

9. The catalyst of claim 1 wherein said chromium compound is a member of the class consisting of chromium (III) 2'-hydroxyacetophenone complex, chromium (III) salicylaldehyde complex, chromium (III) salicylanilide complex, chromium (III) salicylamide complex and chromium (III) 2',5'-dihydroxyacetophenone complex.

10. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 1.

11. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 2.

12. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 3.

13. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 4.

14. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 5.

15. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 6.

16. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 7.

17. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 8.

18. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 9.

19. The process of preparing an active polymerization catalyst comprising the steps of dispersing on a finely divided, difficultly reducible, inorganic support of the class consisting of silica, alumina, thoria, zirconia, titania, magnesia, and mixtures thereof a chromium chelate of an orthohydroxy carbonyl compound essentially of the formula of the class consisting of

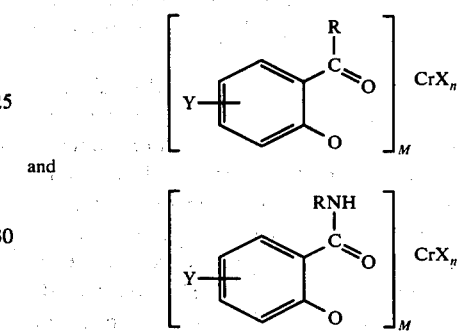

and wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, X is a negative group relative to chromium selected from the group consisting of halide, alkyl and alkoxy, Y is selected from hydrogen, hydroxyl, alkoxy, and alkyl groups, $m$ is a whole number of 1 to 3, $n$ is a whole number of 0 to 2, and $m$ plus $n$ is 2 or 3, and activating the resulting mixture by heating to and at an elevated temperature of from about 600°–2000° F. in a non-oxidizing atmosphere.

20. The process of claim 19 wherein said chromium compound is essentially of the formula

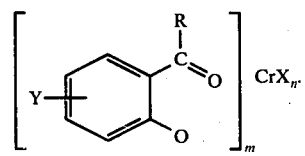

21. The process of claim 19 wherein said chromium compound is essentially of the formula

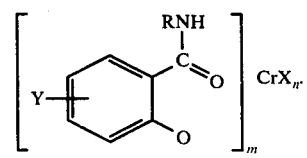

22. The process of claim 19 wherein said support prior to the addition of said chromium compound is dried by heat pretreatment by heating at a temperature of from about 300°–2000° F. until volatile matter is at least partially driven off.

23. The process of claim 19 wherein said chromium compound is dissolved in a solvent and the resulting solution used to impregnate said support.

24. The process of claim 19 wherein said dispersing of said chromium compound is accomplished by dry blending with said finely divided support followed by heating in a fluid bed maintained in suspension with a non-oxidizing gas flowing through said support during said heating.

25. The process of claim 19 wherein said activating is accomplished in a fluid bed maintained in suspension with the flow of a non-oxidizing gas.

26. The process of claim 25 wherein said non-oxidizing gas is selected from the class consisting of nitrogen, hydrogen, carbon monoxide, noble gases and mixtures of these gases.

27. The process of claim 19 wherein said catalyst on a dry basis contains an amount of said chromium compound to provide about 0.05–10 wt.% of chromium.

28. The process of claim 19 wherein said chromium compound is a member of the class consisting of chromium (III) 2'-hydroxyacetophenone complex, chromium (III) salicylaldehyde complex, chromium (III) salicylanilide complex, chromium (III) salicylamide complex and chromium 2',5'-dihydroxyacetophenone complex.

29. The process of claim 19 wherein said activating is in a stationary bed in a non-oxidizing atmosphere provided by evacuation of gas from said bed.

30. The process of claim 19 wherein said activating is in a stationary bed in a non-oxidizing atmosphere provided by a non-oxidizing gas.

31. The process of claim 30 wherein said non-oxidizing gas is selected from the class consisting of nitrogen, hydrogen, carbon monoxide, noble gases and mixtures of these gases.

32. The process of claim 19 wherein said activating is in a fluid bed using a non-oxidizing gas to maintain the mixture of support and said chromium compound in suspension while heating to a final activation temperature of from 850°–2000° F.

33. The process of claim 32 wherein said non-oxidizing gas is selected from the class consisting of nitrogen, hydrogen, carbon monoxide, noble gases and mixtures of these gases.

34. The process of claim 19 wherein said activating is in a fluid bed using a non-oxidizing gas to maintain the mixture of support and said chromium compound in a fluid condition while heating at activating temperatures of from about 300°–350° F. for from about 1 to 3 hours and then at about 550°–600° F. for about 1 to 3 hours to produce an interaction between the chromium compound and the support, followed by final activation at a temperature of of about 850°–2000° F. for a period of about 0.5–12 hours.

35. The process of claim 34 wherein said non-oxidizing gas is selected from the class consisting of nitrogen, hydrogen, carbon monoxide, noble gases and mixtures of these gases.

* * * * *